April 1, 1930.                A. RUEBEL                 1,753,132
                              EDGE TRIMMER
                            Filed May 21, 1928
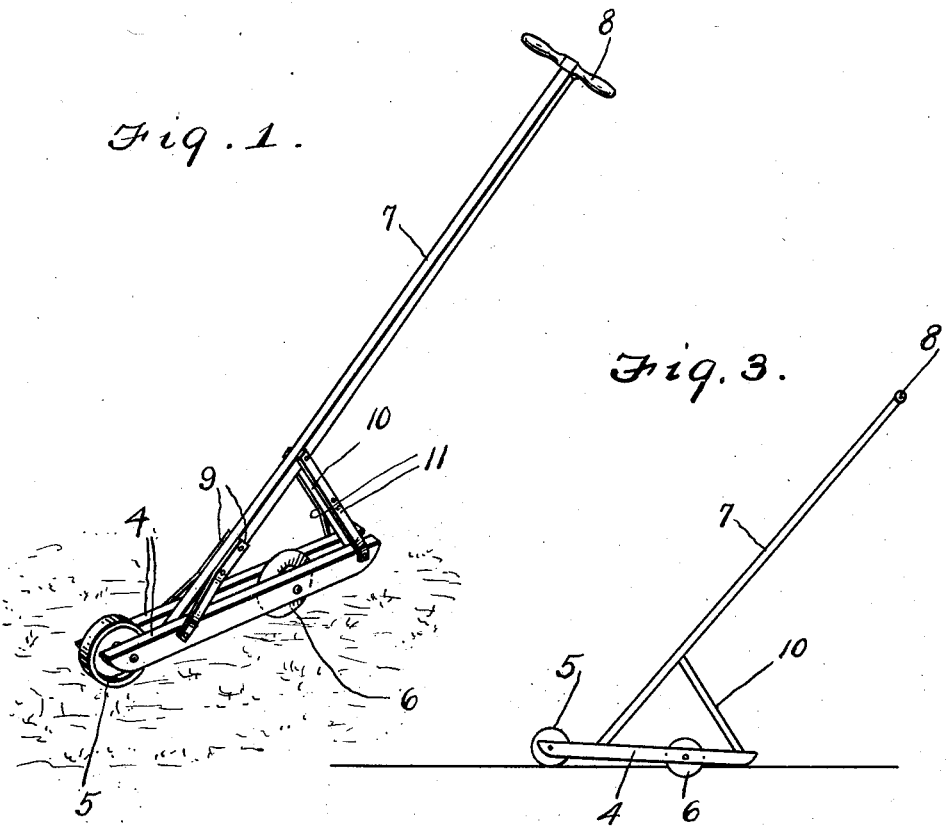
Inventor
*Adam Ruebel*
By *Clarence A. O'Brien*
                    Attorney Patented Apr. 1, 1930

1,753,132

UNITED STATES PATENT OFFICE

ADAM RUEBEL, OF ITHACA, NEW YORK

EDGE TRIMMER

Application filed May 21, 1928. Serial No. 279,397.

The present invention has reference to an improved garden and lawn implement, and it has more particular reference to a structure of this class which is specifically known in the art as an edge trimmer; that is, a device which is constructed for finishing off the edge of a lawn adjacent a pavement, driveway, or the like.

What I have endeavored to do, is provided an implement of this class which is characterized by a novel organization of parts, cooperating with each other to produce a structure, which is efficient in performance, and capable of fulfilling the requirement of an implement of this type in a dependable manner.

I aim also, to provide an implement of this kind, which is especially suitable for the purpose intended, one which has been previously unequaled in the art, and which is practical and modern in construction.

The particular details, and their association will become more readily apparent from the following description and drawings.

In the drawings:—

Figure 1 is a perspective view of an implement constructed in accordance with this invention, showing it in position for use.

Fig. 2 is an enlarged bottom plan view of the implement.

Fig. 3 is a side diagrammatic view showing the position of the implement when in operation.

The structure embodies a frame, which includes a pair of spaced runners 4 between the forward ends of which a surface engaging roller 5 is removably mounted. Located between the intermediate portions of the runners is a removable rotary cutting disk 6.

Fastened between the runners at a point intermediate the roller 5 and the cutting disk 6 is an upwardly and rearwardly inclined handle bar 7. This is provided on its upper end with suitable hand grips 8. The angularity of this handle bar, with respect to the frame, is such as to permit the device to be easily pushed along the surface. It will be noticed that reinforcing straps 9 of metal, are fastened to opposite sides of the handle bar and to the runners as shown in Fig. 1 to render the structure sturdy and rigid.

Moreover, a short brace 10 is fastened to the lower end portion of the handle bar 7, and extends rearwardly and downwardly, where it is bolted between the rear ends of the runners in rearwardly spaced relation between the cutting disks 6. Here again, I provide suitable metal reinforcing straps 11. This brace operates as a stress distributing member, and permits pressure to be brought to bear upon the rear end portion of the frame, so as to embed the cutting disks firmly in the surface, when the parts are in the relative angular positions shown, the complete structure is well-balanced, and appropriate leverage is insured.

The diagrammatic view designated as Fig. 3, brings out the operating position of the implement. As is clear here, it is forced or moved over the surface in a direction from right to left, during which time, the operator grasps the handles 8, and exerts a forward thrust upon the handle bars 7. Simultaneously, a downward pressure is brought to bear upon the rear end portion of the device, through the medium of the short rear diagonal brace 10.

In this way, the cutting disk is formed firmly into the ground to permit a straight edge to be cut along the pavement, driveway or the like.

The device is sufficiently high to permit it to be conveniently manipulated by the operator in a walking position. Hence, it obviates the necessity of stooping and employing other unsatisfactory implements for edging the lawn.

It is thought that by considering the description in connection with the drawings, a clear understanding of the description in connection with the drawings will be had. Therefore, a more lengthy description is regarded unnecessary.

Minor changes in shape, size, and rearrangement of parts coming within the field of invention claimed, may be resorted to if desired.

Having thus described my invention, what

I claim as new is:—

In a lawn edging implement of the class described, a frame embodying a pair of spaced parallel runners, a surface engaging roller rotatably mounted between the forward ends of the runners, a rotary cutting disc mounted between the intermediate portions of the runners, an upwardly and rearwardly inclined handle fastened at its lower ends between the runners at a point intermediate the roller and cutting disc, together with a downwardly and rearwardly inclined brace fastened to the intermediate portion of the handle, and also fastened between the rear ends of the runners at a point in rearwardly spaced relation from the cutting disc, whereby the rear ends of the runners may be urged into ground engaging contact constituting a guide for the cutting disc.

In testimony whereof I affix my signature.

ADAM RUEBEL.